United States Patent [19]

Rozman

[11] Patent Number: 5,006,768
[45] Date of Patent: Apr. 9, 1991

[54] SYNCHRONOUS MOTOR CONTROL

[75] Inventor: Gregory I. Rozman, Rockford, Ill.

[73] Assignee: Sundstrand Corporation, Rockford, Ill.

[21] Appl. No.: 423,940

[22] Filed: Oct. 19, 1989

[51] Int. Cl.$^5$ .............................................. H02P 1/46
[52] U.S. Cl. .................................. 318/254; 318/431; 318/778
[58] Field of Search ............... 318/138, 254, 430, 431, 318/439, 599, 605, 661, 705, 715, 778, 779, 811; 340/825.2, 870.34

[56] References Cited

U.S. PATENT DOCUMENTS

| | | | |
|---|---|---|---|
| 4,085,355 | 4/1978 | Fradella | 318/721 |
| 4,447,771 | 5/1984 | Whited | 318/661 |
| 4,641,075 | 2/1987 | Asano et al. | 318/811 |
| 4,651,068 | 3/1987 | Meshkat-Razavi | 318/439 X |
| 4,656,401 | 4/1987 | Ninomiya et al. | 318/779 X |
| 4,772,996 | 9/1988 | Hanei et al. | 318/811 X |
| 4,841,213 | 6/1989 | Tomasek | 318/605 X |

Primary Examiner—Bentsu Ro
Attorney, Agent, or Firm—Wood, Phillips, Mason Recktenwald & VanSanten

[57] ABSTRACT

The problem of efficiently starting a motor (16) which is used to start an engine (12) during engine start is solved with a motor control unit (30) which includes a resolver (34) having a primary winding (34P) coupled to an oscillator (36). The resolver (34) includes two single-phase secondary windings (34S1, 34S2) which are placed in space-quadrature to each other and which develop signals proportional to the sine and cosine of the angular position of the rotor for the motor (16). The sine wave and the cosine wave are transferred to a phase conversion circuit (46) which develops three sinusoidal signals 120° out of phase with respect to each other. Each of the three developed sinusoidal signals is supplied to a respective multiplier circuit (51–53) which also receives a current command. The output of each multiplier (51–53) is a sinusoidal current command signal. The command signal is applied as one input to a current control loop (60–62) which also receives an actual phase current signal developed by a current sensor (32A–32C) for each of the three phases. The output of each loop is a control signal to an inverter (26) which powers the motor (16).

5 Claims, 2 Drawing Sheets

SYNCHRONOUS MOTOR CONTROL

FIELD OF THE INVENTION

This invention relates to motor controls, and more particularly to a low speed motor control.

BACKGROUND OF THE INVENTION

Conventional electrical power systems utilize a synchronous generator for generating AC power. Particularly, such a generator includes a rotor and a stator having a stator coil. In applications such as an aircraft, the rotor is driven by an engine so that electrical power is developed in the stator coil. Owing to the variation in engine speed, the frequency of the power developed in the generator windings is similarly variable. This variable frequency power is converted to constant frequency power using a variable speed constant frequency (VSCF) system including a power converter which may develop, for example, 115/200 volt AC power at 400 hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motor power to start the engine. The components required in such a start control increase the weight of the aircraft and take up valuable space. To minimize the size and weight of such start controls, certain known aircraft VSCF power systems have utilized the existing converter and GCCU for the start control.

The present invention relates to a control for a synchronous motor which uses a pulse width modulation (PWM) controlled inverter. One example of such a control is described in Roe et al. U.S. patent application Ser. No. 285,117, filed Dec. 16, 1988, entitled "Control for Producing a Low Magnitude Voltage at the Output of a PWM Inverter", and assigned to the assignee of the present invention. Particularly, such control includes a resolver which develops a signal representing the position of a rotor. A wave form generator is responsive to the rotor position signal and comprises a lookup table to generate three phase displaced half cycle reference wave forms. Such wave forms are commonly referred to as six-step wave forms. These reference wave forms are combined with a duty cycle wave form and a modulation wave form to derive first, second and third pulse width modulated switch control signals for driving the switches in a three phase bridge inverter circuit.

Such a control for a PWM inverter may be utilized in the start mode of operation. Nevertheless, it is desirable to simplify the overall control system.

SUMMARY OF THE INVENTION

In accordance with the present invention, a motor control is operable to develop an instantaneous current reference from a demodulated resolver output.

Broadly, there is disclosed herein a control for a brushless electro-motive machine having a rotor and a stator having a stator coil which is controllably energized from a source of power for imparting rotation to the rotor. The control includes first means for developing a sinusoidal signal representing angular position of the rotor, and second means for developing a current command signal representing a desired stator current level. Means are coupled to the first and second developing means for generating a current reference signal sinusoidally representing desired stator current. Sensing means are provided for sensing current through the stator coil and generating a sinusoidal signal representing actual stator current. A control means is coupled to the sensing means and the generating means for controlling energization of the stator coil responsive to the desired stator current and the actual current to control motor current.

It is a feature of the invention that the developing means comprises a resolver having a rotor rotatable with the rotor of the motor.

It is another feature of the invention that the sinusoidal signal is multiplied by the current command signal.

It is a further feature of the invention when used in connection with a polyphase motor that the developing means include converting means for developing a sinusoidal signal for each motor phase.

It is yet another feature of the invention that the control means comprises an inverter.

The motor control includes a resolver having a rotor coupled to the motor shaft and having a rotor primary winding coupled to an oscillator. The resolver includes two single-phase secondary windings which are placed in space-quadrature to each other and which develop signals proportional to the sine and cosine of the rotor's angular position. The sine wave and the cosine wave are transferred to a phase conversion circuit which develops three sinusoidal signals 120° out of phase with respect to each other.

Each of the three developed sinusoidal signals is supplied to a respective multiplier circuit which also receives a current command signal. The output of each multiplier is a sinusoidal current command signal. The command signal is applied as one input to a summer which also receives an actual phase current signal developed by a current sensor for each of the three phases. The output of each summer is a current error signal for the particular phase which is applied to a compensation function for developing a drive signal to the inverter.

The PWM inverter functions as a current source inverter which directly controls torque as a function of current. This provides a circuit which efficiently starts the engine while eliminating torque ripples which might otherwise result from the use of six-step pulses for starting.

Further features and advantages of the invention will readily be apparent from the specification and from the drawings.

DESCRIPTION OF THE INVENTION

Figure 1:
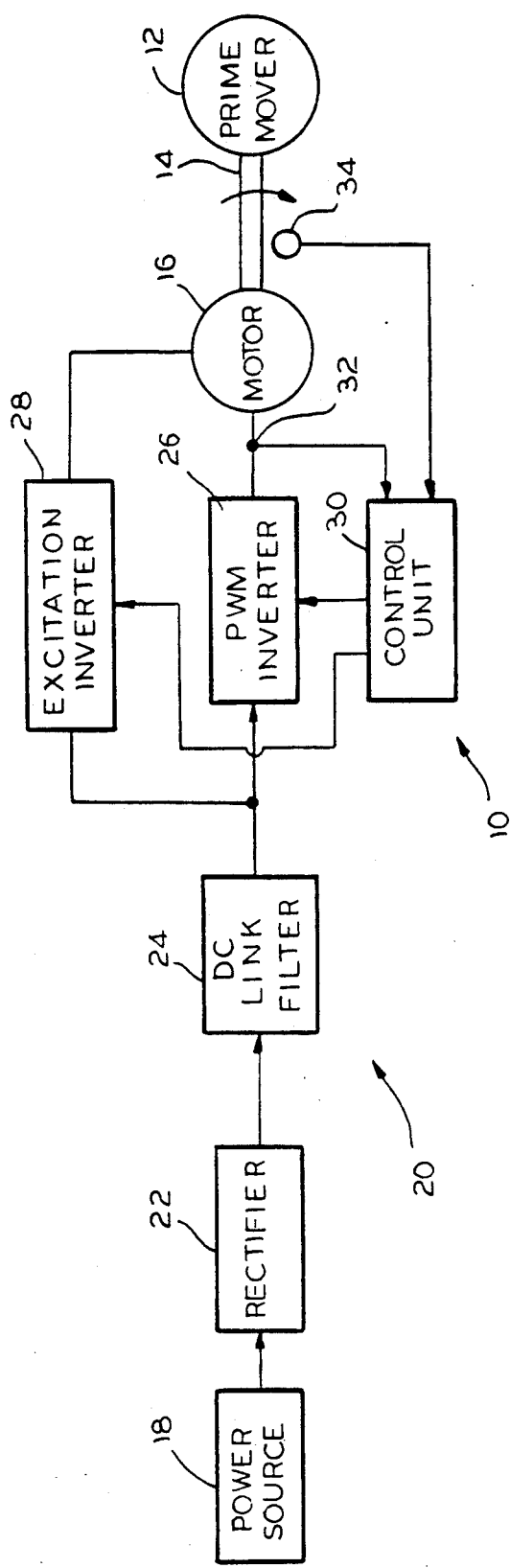
FIG. 1 is a generalized block diagram of a start control system including a control unit according to the invention.

Referring to FIG. 1, a block diagram representation illustrates the operation of an electrical power system 10 configured to operate in a start mode of operation. Specifically, the system 10 includes a prime mover, or engine 12, connected through a shaft 14 to a generator/motor 16. In a typical application, the engine 12 is the main engine in an aircraft, and the generator/motor 16 is operated as a generator for developing power for powering aircraft loads (not shown).

During engine start, the engine 12 is started using the generator/motor 16 operating as a motor.

Particularly, a power source 18 is coupled to a converter 20. The converter 20 includes an AC/DC converter 22 in the form of a full wave bridge rectifier circuit of conventional construction which is operable to convert three phase AC power from the power source 18 to DC power. The rectifier 22 is connected through a DC link filter 24 to a pulse width modulation (PWM) inverter circuit 26. The PWM inverter 26 includes a conventional inverter circuit having six power switches connected in a three phase bridge configuration. Each switch includes a base drive circuit operated by a PWM generator of conventional construction to control the output of the PWM inverter 26 by varying the duty cycle of the switches. The PWM inverter 26 is in turn connected to a three phase stator coil, or armature winding, of the motor 16.

The converter 20 also includes an excitation inverter 28 connected to the DC link filter 24 for developing AC power for a motor field winding.

Both the PWM inverter 26 and the excitation inverter 28 are controlled by a control unit 30. The control unit 30 receives current feedback signals from a current sensor 32 which senses the output from the PWM inverter 26 representing actual per phase current. The control unit 30 also receives a signal from a resolver 34 which represents angular position of the shaft 14, and thus also the rotor for the motor 16.

Figure 2:
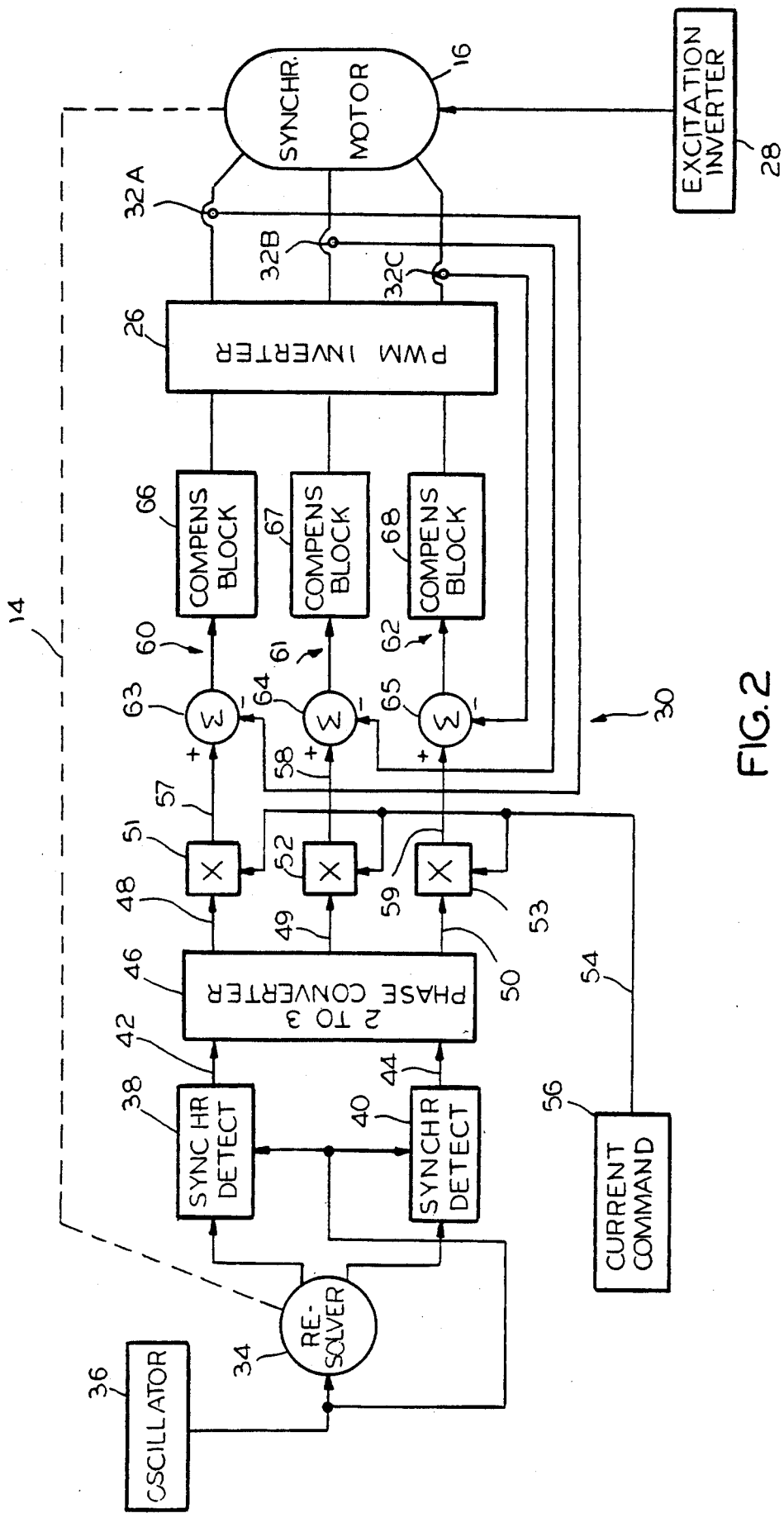
FIG. 2 is a detailed block diagram of the control unit according to the invention.

With reference to FIG. 2, a block diagram specifically illustrates an implementation for the control unit 30 configured to provide motor control at low speeds. Specifically, the control unit 30 is used during the very early stages of engine start.

As discussed above, the synchronous motor 16 is coupled via the shaft 14 with the resolver 34. The resolver 34 provides sine waves having magnitudes which uniquely define the displacement angle of the rotor at any time. The excitation for the resolver is supplied by an oscillator 36 which develops a signal in accordance with the equation $E \sin \omega t$. The excitation frequency $\omega$ is high with respect to the running speed of the motor 16 in the illustrated embodiment of the invention. The oscillator 36 is also connected to synchronous detectors 38 and 40.

Figure 3:
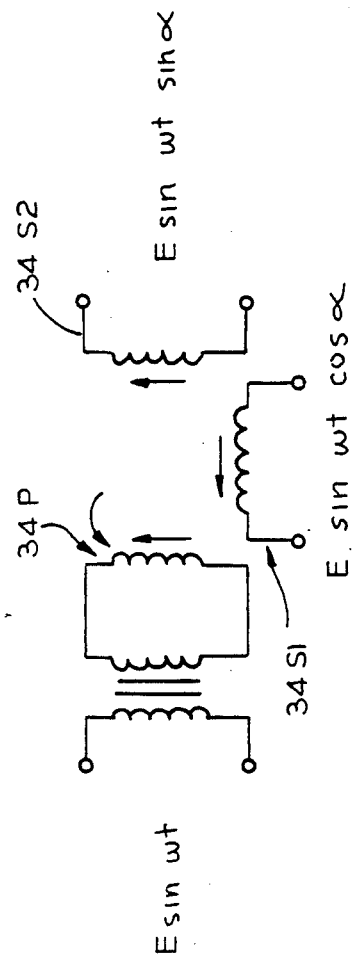
FIG. 3 is a schematic for the resolver of FIG. 1.

The resolver 34, see FIG. 3, is configured as a rotor and a stator. Specifically, its rotor is connected to and rotates with the shaft 14. The rotor carries a primary winding 34P which is wound single-phase and is connected to the oscillator 36 to provide excitation. The stator is wound with two single-phase secondaries 34S1 and 34S2, which are placed in space-quadrature to each other and which provide respective signals proportional to the cosine and sine of the rotor's angular position. The two secondaries are connected to the respective synchronous detectors 38 and 40. The output from the first secondary 34S1 to the first synchronous detector 38 is in accordance with the equation $E \sin \omega t \cos \alpha$, while the output from the second secondary 34S2 to the second synchronous detector 40 is in accordance with the equation $E \sin \omega t \sin \alpha$, where E represents magnitude of the voltage, and $\alpha$ represents electrical phase angle position.

The synchronous detectors 38 and 40 comprise demodulator circuits which strip the carrier signal from the composite signals to produce a cosine signal on a line 42 and a sine signal on a line 44. Specifically, the output of the first synchronous detector 38 on the line 42 is in accordance with the equation $E \cos \alpha$, while the output of the second detector 40 on the line 44 is in accordance with the equation $E \sin \alpha$. The sine and cosine signals are 90° out of phase with respect to one another, as is apparent.

The cosine and sine signals on the lines 42 and 44 are applied to a "two-to-three" converter 46 which converts the cosine signal on the line 42 and the sine signal on the line 44 into three sinusoidal wave form outputs on the lines 48-50. The three sinusoidal wave forms are phase displaced 120° with respect to each other and are represented by the equations $E \sin \alpha$, $E \sin (\alpha - 120)$, and $E \sin (\alpha - 240)$, respectively.

The two-to-three phase converter 46 may be similar to that described in Kawada et al. U.S. Pat. No. 4,361,794, the specification of which is hereby incorporated by reference herein.

The signals on the lines 48-50 are fed to respective multipliers 51-53. Each of the multipliers 51-53 also receives a current command signal on a line 54 from a current command block 56. Specifically, the current command block 56 develops a signal representing a desired inverter output current to the motor 16. The output from each of the multipliers 51-53 is an instantaneous current reference on a respective line 57-59 which is applied to a respective current loop control 60-62. Each current loop 60-62 includes a respective summer 63-65 having an output connected to a compensation block 66-68. Each summer 63-65 is also connected to a respective current sensor 32A, 32B and 32C which sense inverter output current for each of the three phases A, B, and C.

The phase A current loop 60 is operable to develop a current error from the first summer 63 representing the difference between the desired stator current on the line 57 and the actual phase A stator current sensed by the first sensor 32A. The current loop error is applied to the compensation block 66 which may provide, for example, proportional and integral control and develop a voltage signal representing a compensated current error to provide a switching pattern to the PWM inverter 26. This switching pattern may be used in connection with the PWM inverter 26 as a reference waveform signal, or may be used for directly controlling the switching of the inverter. Each of the other current control loops 61 and 62 operates in a similar manner for phases B and C.

The PWM inverter 26 may pulse width modulate the three sinusoidal signals from the current loops 60-62.

The PWM inverter 26 functions as a current source inverter which directly controls torque as a function of current. This provides a circuit which efficiently starts the engine while eliminating torque ripples which might otherwise result from the use of six-step pulses for starting.

Since the excitation inverter 28 and its control do not form part of this invention, no specific implementation is illustrated herein. A typical implementation for such a control is disclosed in Rozman et al. copending application Ser. No. 270,625, filed Nov. 14, 1988.

Thus, the invention broadly comprehends a motor control which utilizes the output from the resolver to form the instantaneous current reference which significantly simplifies the control system.

In the illustrated embodiment, the control unit 30 is implemented in a software programmed microprocessor. Alternatively, the control unit 30 could be implemented with suitable electrical or electronic circuits, as is obvious to those skilled in the art.

I claim:

1. A start control for a brushless motor having a rotor and a stator having a three-phase stator coil comprising:
    a resolver circuit including means for generating two phase displaced sinusoidal signals each representing angular position of the rotor;
    a converter circuit coupled to said resolver circuit for converting said two phase displaced sinusoidal signals to three phase displaced sinusoidal signals;
    means for developing a current command signal having a level representing a desired stator current level;
    means coupled to said converter circuit and said developing means for combining each of said three phase displaced sinusoidal signals with said current command signal to provide three phase displaced sinusoidal current reference signals;
    sensing means for sensing current through each phase of said stator coil;
    a current control coupled to said sensing means and said combining means including means for developing a compensated error signal for each phase; and
    an inverter circuit operatively driven by said compensated error signals and coupling a source of power to said stator coil to provide closed loop control of motor starting current.

2. The start control of claim 1 wherein said combining means comprises means for multiplying said current command signal with each of said three phase displaced sinusoidal signals.

3. The start control of claim 1 wherein said inverter circuit comprises a three-phase bridge current source inverter.

4. The start control of claim 1 wherein said converter circuit develops said three phase displaced sinusoidal signals, each phase displaced 120° with respect to each other.

5. The start control of claim 1 wherein said inverter circuit develops pulse width modulated output signals to said stator coil.

* * * * *